`2,906,636`

PROCESS FOR MAKING AN ORNAMENTAL ARTICLE FROM A FLOWER

Helen L. Hoivik, St. Paul, Minn.

No Drawing. Application June 14, 1955
Serial No. 515,560

4 Claims. (Cl. 117—3)

This invention relates to a method of producing decorative articles from plant life and particularly by utilizing specimens of flowers, leaves and the like in natural or artificially colored condition and stiffened and retained in three-dimensional form as a long-lasting artistic object.

My invention contemplates the simple production of articles from specimens of plant life without attempting to carefully preserve in near original condition the plant as it existed in nature. I am aware of many attempts to treat specimens of flowers and the like so as to chemically preserve the colors and then to completely dehydrate each specimen. Such prior art specimens are then carefully handled while in dry and brittle condition and are subsequently coated or impregnated with a plastic film.

Thus, the processes disclosed in Fessenden Patents No. 2,567,929; No. 2,606,843; No. 2,658,836; and No. 2,698,809 are directed toward preserving the natural colors and shape of dead flowers, leaves, insects and the like, the end goal being the presentation of a life-like and natural appearance of a normally unstable or impermanent object. The coloring substance of the specimen, according to the teachings of the above named prior art patents, is first stabilized and preserved and then the specimen in its dried and fragile condition is carefully embedded in, impregnated or coated with plastic material.

In contrast to the foregoing objectives, I desire to create a decorative article which may be constructed of or have designs made of whole plant specimens or parts thereof. I maintain the selected construction or design in its intricate and detailed form and may artificially color or permit the plant life to assume such color change as may take place during my process. The finished article has strength sufficient to resist normal handling and abuse even where the article is formed of or decorated with delicate plant parts such as the petals of a flower.

I am also aware of other prior art methods of preserving flowers and the like including the temporary expedient of dipping fresh flowers in wax which forestalls wilting of the flower, but does not prevent ultimate decay and destruction thereof. My invention is concerned with producing a decorative article of permanent nature and it is an important object of the invention to provide a simple and inexpensive method for maintaining the constructed configuration of a plant life design in reinforced and stiffened form and having unusual color and artistic effects.

It is another object of the invention to provide a novel method of stiffening a specimen of plant life and preserving it against decay and deterioration prior to coating and strengthening the specimen for permanence.

A further object of the invention resides in a unique method, preparatory to enveloping in plastic material, of drying and preserving a flower specimen and the like while it is partially water-proofed and stiffened and without removing the water-proofing material.

It is a still further object of the invention to produce efficiently and economically a three-dimensional article from plant life, and wherein the article has the general appearance of an intricately constructed hand-carved or glass-blown piece of art.

These and other objects and advantages of my invention will more fully appear from the following description of the utilization thereof.

In practice, I have made many three-dimensional articles such as candle stick holders, earrings, ashtrays, book marks, and so forth. Sometimes, flower buds and leaves may be arranged in artistic form to obtain unusual effects. In other instances, the petals of flowers, leaves, stems and the like may be separated and regrouped into artistic configuration. Thus, I have taken large flower petals and arranged them into dish form in the construction of ashtrays and candy dishes. The specific applications of my invention are limitless and the value of the articles is largely proportionate to the skill of the one practicing my invention.

When I select specimens of plant life for use in my invention, I prefer that they be in fresh condition. In the case of flowers, best results are obtained by processing them immediately after picking and drying. I have found that dew or rain clinging to petals and leaves must first be dried before subjecting them to my process.

I have further found that any signs of fungus or bacteria or any bruises or defects in the plant specimen should be cut out before subjecting the plant to my process. It is essential that bacterial growth be arrested until such time as the moisture content of the plant is low enough to resist damage.

Where flower stems and thin sections of plant life are to be incorporated in my decorative articles, I may reinforce them with wire and even wrap them with tape or other strengthening and reinforcing materials. No special preliminary treatment is required, but, if desired, the surface of flowers and the like may be colored artificially by brushing, spraying, painting or otherwise applying the color to the surface of the plant. Such color may be applied uniformly or in patterns to the plant surface and does not necessarily remain exactly the same at the completion of my process. Many unusual effects are obtained accidentally by color changes, both in the natural pigment of the plant and in the added color. There is no particular preference in the selection of coloring material, and experience will dictate whether the color maintains its brilliance or becomes muddied over a period of time. I have found that oil colors are generally harmful to flowers and, hence, are to be avoided.

The first step in my process requires that the flower or other plant specimen be stiffened and water-proofed in an imperfect manner for a purpose to be subsequently described. This stiffening and water-proofing material must not attack the plant either by chemical or physical action. Furthermore, it is preferred that the material be in molten condition and permitted to harden in a thin film over the surface of the flower or the like so that small imperfections in the film will exist. Such imperfections are naturally present if the material is maintained at a temperature slightly above its melting point and small bubbles, bridging and laterally disposed fibers lie across the surfaces of the film. The material collected for stiffening and imperfectly water-proofing the flower or other plant specimen is naturally itself impervious to water, and should be quite stiff but not brittle in nature. Furthermore, I desire that the material be transparent or translucent. Still further, in order to avoid injuring the cells of the plant specimen, the melting point must not be so high as to break down or cook such cells.

There are many materials which will meet the above qualifications and mixtures of natural waxes as well as synthetic factors can be used to advantage. Furthermore, amides or aliphatic ketones may be mixed with the waxes to vary their physical properties to some degree. For best results, I have found that a dipping temperature of between 135° Fahrenheit and 180° Fahrenheit is preferred. After formulating a great number of stiffening and water-proofing materials, I have found that a simple mixture of paraffin and white petroleum wax (refined and clear) performs satisfactorily and is also economical and easy to work with. I have also successfully used mixtures of paraffin and beeswax or candelilla wax.

For leaves and other forms of plant life which contain natural waxy substances, I find that an alcoholic solution of shellac may be used to advantage. The shellac solution may also be applied to the wax film after it has hardened upon the plant specimen and additional stiffening may be gained thereby. Care must be taken, however, not to completely water-proof the surface of the plant since my process would be defeated thereby. In dipping the flower or other specimen, I prefer to move the specimen about so as to eliminate bubbles and, upon withdrawing the specimen from the molten solution, twirl or shake off the excess of molten material. The film of stiffening and water-proofing material hardens in a short time and renders the specimen capable of handling without particular care. In this connection, it should be noted that prior art processes which depend on preliminarily drying each specimen, create a delicate and fragile product which is sometimes impossible to handle without damage. It is extremely difficult to coat with molten material the delicate petals of a flower which has been dried in the air or in sand, sawdust and the like. Many times mere air movement or removal of the sand or sawdust will itself break off and tear the delicate petal portions of a flower.

The second step in my process requires a slow drying of the internal moisture of the plant specimen which is covered by the stiffening and imperfect water-proofing agent. In some instances, I have been able to air-dry the coated specimens but the specimen must then be highly resistant to fungus and bacterial action. Furthermore, the natural drying of internal moisture through the waxy coating imperfections may produce rotting of the specimens before sufficient moisture has evaporated from the specimen.

When dealing with flowers having a high percentage of moisture such as tuberous begonias, it is necessary to utilize other means for drying and preserving the flower until such time as the moisture content is below that point at which bacterial action will proceed.

I have discovered that a specimen, imperfectly water-proofed as noted above, can be dried and maintained in preserved condition if it is frozen and kept in a freezer for at least one month and as much more time as desired. The waxy coating remains in place and the specimen will drop considerably in moisture content by virtue of the imperfections in the coating which permit small escapages of ice vapor therethrough. As previously pointed out, the waxed specimen may also be coated with a thin layer of shellac but the drying time must then be extended. The following are specific examples in which flowers and leaves have been frozen after the preliminary treatment and showing the moisture loss over various periods of time. Comparisons with drying at room temperature and in sawdust are made in each example. The flowers employed were of the gladioli variety. Initial wax coating was paraffin and white petroleum wax in equal parts and heated to 160° Fahrenheit. The shellac was commercial white shellac in an alcohol vehicle. Weights in grams and percentages of moisture loss are given below:

GLADIOLA AND STEM—COATED WITH WAX AND SHELLAC

| Time interval | Room condition | | | In sawdust | | | In freezer | | |
|---|---|---|---|---|---|---|---|---|---|
| | Total weight | Weight lost | Percent weight lost | Total weight | Weight lost | Percent weight lost | Total weight | Weight lost | Percent weight lost |
| Original | 29.4 | | | 28.3 | | | 38.55 | | |
| 1 week | 24.7 | (4.7) | 16 | 24.0 | (4.3) | 15.4 | 36.7 | (1.8) | 4.7 |
| Do | 19.4 | (5.3) | 18 | 19.5 | (4.5) | 15.9 | 34.1 | (2.6) | 6.8 |
| 2 weeks | 10.5 | (8.1) | 30.3 | 11.3 | (8.2) | 29.0 | 31.1 | (3.0) | 7.8 |
| | | 18.4 | 64.3 | | 17.0 | 60.3 | | 7.4 | 19.3 |

PLAIN LEAF—SHELLAC COATING

| Time interval | Room condition | | | In sawdust | | | In freezer | | |
|---|---|---|---|---|---|---|---|---|---|
| | Total weight | Weight lost | Percent weight lost | Total weight | Weight lost | Percent weight lost | Total weight | Weight lost | Percent weight lost |
| Original | 5.0 | | | 3.2 | | | 3.9 | | |
| 1st week | 3.0 | (2.0) | 40 | 2.3 | (0.9) | 27.9 | 3.5 | (0.4) | 10.2 |
| 2nd week | 2.2 | (0.8) | 16 | 1.5 | (0.8) | 25.0 | 3.3 | (0.2) | 5.1 |
| 3d week | | | | | | | 3.0 | (0.3) | 7.7 |
| | | 2.8 | 56 | | 1.7 | 52.9 | | 0.9 | 23.0 |

FLOWER ALONE—WAXED AND SHELLACKED

| Time interval | Room condition | | | In sawdust | | | In freezer | | |
|---|---|---|---|---|---|---|---|---|---|
| | Total weight | Weight lost | Percent weight lost | Total weight | Weight lost | Percent weight lost | Total weight | Weight lost | Percent weight lost |
| Original | 11.9 | | | 13.9 | | | 18.9 | | |
| 1st week | 10.5 | (1.4) | 11.8 | 11.5 | (2.4) | 17.3 | 18.5 | (0.4) | 2.1 |
| 2nd week | 8.4 | (2.1) | 17.7 | 9.5 | (2.0) | 14.4 | 17.2 | (1.3) | 6.9 |
| 4th week | 7.0 | (1.4) | 11.8 | 8.3 | (1.2) | 8.6 | 16.0 | (1.2) | 6.4 |
| | | 4.9 | 41.3 | | 5.6 | 40.3 | | 2.9 | 15.4 |

FLOWER ALONE—WAXED BUT NOT SHELLACKED

| Time interval | Room condition | | | In sawdust | | | In freezer | | |
|---|---|---|---|---|---|---|---|---|---|
| | Total weight | Weight lost | Percent weight lost | Total weight | Weight lost | Percent weight lost | Total weight | Weight lost | Percent weight lost |
| Original | 10.9 | | | 15.3 | | | 11.0 | | |
| 1st week | 8.6 | (2.3) | 21.0 | 11.5 | (3.8) | 24.8 | 10.5 | (0.5) | 4.5 |
| 2nd week | 7.3 | (1.3) | 11.9 | 9.2 | (2.3) | 15.0 | 10.0 | (0.5) | 4.5 |
| 4th week | | | | | | | 9.2 | (0.8) | 7.3 |
| | | 3.6 | 32.9 | | 6.1 | 39.8 | | 1.8 | 16.3 |

Those particular dried flowers which were dried under room conditions were badly faded and, in some cases, had shown signs of deterioration. Those flowers buried in sawdust became so dry that the waxy coating chipped off from the surface during handling. These flowers were all in such condition as not to warrant further processing.

Those flowers which were dehydrated in a freezer lost weight at a slower rate than those subjected to room temperature and those buried in dry sawdust. Furthermore, there was no evidence of black fungus spots or deterioration of the flowers which had been frozen during dehydration.

One rather peculiar fact was the increased rate of drying in some instances during the second week in the freezer over that in the first week. It would appear from the experiments which I made that the rate of drying is fairly consistent throughout the period in which the coated specimens were kept in the freezer.

Once the flower has been dried without rotting to a predetermined moisture content which may vary from flower to flower, there is no longer any danger of rotting or moulding.

The third step in my process is the final thorough water-proofing and coating of the previously prepared specimen so as to give it lasting permanence. The coating or enveloping of plants, insects and other specimens is well known in the art and my procedure does not vary to any appreciable extent from that taught in the literature. The type of plastic which I prefer is a clear, cold-setting material which will be water-proof and strong, yet which may be compatible with the surface of the specimen as previously prepared, and will render it a beautiful object of art. I have successfully employed epoxy-type resins, polyester resins, ethyl methacrylate for the enveloping coat, and in all probability, a number of other plastic materials now known and to be developed will properly function in the same manner. For the above named plastic materials, I have found that the waxy coating, if not already previously covered with a film of shellac, should have this thin coating applied before the plastic material is put on. If this step is not taken, there may be a tendency for the plastic material to ball up or separate from the specimen. The plastic material is, of course, catalyzed in well known manner so as to set in a reasonable length of time, usually three to four hours. The plastic could not set so rapidly as to heat and melt the wax and, at the same time, should not set so slowly as to render the process uneconomical. Since plastic materials, such as the above named, are strongly adherent to many materials including metal, glass, cloth and pottery, the construction of composite articles is thereby facilitated. The specimen can be applied to a decorative article at the same time that the plastic coat is setting.

It may thus be seen that I have devised a simple and shortened process for producing decorative articles from specimens of plant life wherein special chemical treatment for preserving coloration and for guarding against fungus and bacteria is eliminated. At the same time, the plant life is easy to handle at all stages of the process and will never approach the fragility of a flower specimen which has been dried before stiffening as proposed in prior art practices. The versatility in applications of the process is limitless and the artistic effects which can be obtained by my simple process appear to be accomplished by a highly skilled artisan even though actually produced by an amateur.

What I claim is:

1. A process for making an ornamental article from a freshly picked flower which consists in stiffening and coating the entire surface of the flower at moderate temperature conditions which will not injure plant cells with a water-proofing film which has imperfections which will permit water vapor to pass therethrough, freezing the stiffened and coated flower, allowing the frozen flower to dry in a dry atmosphere for a length of time which will materially reduce the natural water content of the flower by vaporization through said imperfections, completely covering and waterproofing the flower with a film of cold-setting plastic material, and permitting the film to solidify.

2. A process of making an ornamental article from a freshly picked flower which consists in stiffening and coating the entire surface of the flower at moderate temperature conditions which will not injure plant cells with a wax film which has imperfections which will permit water vapor to pass therethrough, freezing the stiffened and waxed coated flower, allowing the frozen flower to dry in a dry atmosphere for a length of time which will materially reduce the natural water content of the flower by vaporization through imperfections in the wax coating, completely covering and waterproofing the flower with an external film of cold-setting plastic material, and permitting the film to solidify.

3. The process set forth in claim 2, wherein the wax film on the flower is coated with a thin layer of white shellac prior to the step of covering and waterproofing with the cold-setting plastic material.

4. The process set forth in claim 1, wherein artificial coloring material is applied to the flower prior to completely covering and waterproofing the flower with said cold-setting plastic material.

References Cited in the file of this patent

UNITED STATES PATENTS

| | | |
|---|---|---|
| 996,788 | Ostrander | July 4, 1911 |
| 1,038,562 | Gayle | Sept. 17, 1912 |
| 1,076,786 | Therese | Oct. 28, 1913 |
| 1,882,377 | Whittelsey | Oct. 11, 1932 |
| 1,931,325 | Pillsbury | Oct. 17, 1933 |
| 1,935,706 | Joffe | Nov. 21, 1933 |
| 2,013,063 | Miller | Sept. 3, 1935 |
| 2,224,284 | Barnett | Dec. 10, 1940 |
| 2,292,447 | Irwin | Aug. 11, 1942 |

OTHER REFERENCES

Rubber Age, December 1940, page 75, "Reducing Moisture Loss From Fruits and Vegetables."